United States Patent
Kaneko et al.

(10) Patent No.: US 10,241,008 B2
(45) Date of Patent: Mar. 26, 2019

(54) VEHICLE RESTRAINING DEVICE

(71) Applicant: MEIDENSHA CORPORATION, Tokyo (JP)

(72) Inventors: Ryo Kaneko, Ota (JP); Nobuhiko Asakura, Ota (JP); Yoshimasa Sawada, Konosu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 15/767,765

(22) PCT Filed: Aug. 9, 2016

(86) PCT No.: PCT/JP2016/073377
§ 371 (c)(1),
(2) Date: Apr. 12, 2018

(87) PCT Pub. No.: WO2017/064911
PCT Pub. Date: Apr. 20, 2017

(65) Prior Publication Data
US 2018/0306674 A1 Oct. 25, 2018

(30) Foreign Application Priority Data
Oct. 15, 2015 (JP) .................................. 2015-203423

(51) Int. Cl.
*G01M 17/007* (2006.01)
(52) U.S. Cl.
CPC ............................... *G01M 17/0074* (2013.01)
(58) Field of Classification Search
CPC .......... G01M 17/0074; G01M 17/007; G01M 17/0072; G01M 17/045; G01M 17/065; G01M 9/062
See application file for complete search history.

(56) References Cited

U.S. PATENT DOCUMENTS

| | | | | |
|---|---|---|---|---|
| 4,455,866 A | * | 6/1984 | Barrigar | G01M 17/0074 73/116.07 |
| 5,111,685 A | * | 5/1992 | Langer | G01M 17/0074 73/118.01 |

(Continued)

FOREIGN PATENT DOCUMENTS

| | | |
|---|---|---|
| DE | 3630231 A | 3/1988 |
| JP | 62-209334 A | 9/1987 |

(Continued)

OTHER PUBLICATIONS

Japanese Decision to Grant a Patent and English translation, Application No. 2015-203423, dated Dec. 19, 2016, 6 pages.

*Primary Examiner* — Freddie Kirkland, III
(74) *Attorney, Agent, or Firm* — Foley & Lardner LLP (57) ABSTRACT

An object of the present invention is to reproduce vehicle behavioral frequencies during a vehicle test that are close to those on a road. Vehicle restraining devices 1 restrain a vehicle 3 provided on a chassis dynamometer 2 and are each provided with a first attachment member 4, a support post unit 5, a second attachment member 6 and a buffer unit 7. The first attachment members 4 are attached to right and left front end portions and rear end portions of the vehicle 3. The second attachment members 6 are attached to the support post units 5. The buffer units 7 are provided between the first attachment members 4 and the second attachment members 6. Further, the buffer units 7 are filled with air and can be compressed freely.

11 Claims, 6 Drawing Sheets (56) References Cited

U.S. PATENT DOCUMENTS

| | | | |
|---|---|---|---|
| 6,427,528 B1* | 8/2002 | Yamakado | G01M 17/0072 |
| | | | 73/121 |
| 7,926,337 B2 | 4/2011 | Inoue et al. | |
| 8,186,207 B2* | 5/2012 | Litz | G01M 17/0074 |
| | | | 73/116.07 |
| 8,607,626 B2* | 12/2013 | Litz | G01M 17/007 |
| | | | 73/116.07 |
| 2009/0133484 A1 | 5/2009 | Inoue et al. | |
| 2018/0299350 A1* | 10/2018 | Takahashi | G01M 17/0074 |

FOREIGN PATENT DOCUMENTS

| | | |
|---|---|---|
| JP | 6-45234 Y2 | 11/1994 |
| JP | 7-306122 A | 11/1995 |
| JP | 2559999 Y2 | 1/1998 |
| JP | 2560002 Y2 | 1/1998 |
| JP | 2007-132766 A | 5/2007 |
| JP | 2009-128319 A | 6/2009 |
| JP | 2009-271025 A | 11/2009 |

\* cited by examiner

VEHICLE RESTRAINING DEVICE

TECHNICAL FIELD

The present invention relates to a vehicle restraining device which restrains a vehicle in a vehicle test device, such as a chassis dynamometer in which the vehicle is set on rollers and tests for measuring fuel economy and exhaust gas are carried out.

BACKGROUND TECHNOLOGY

When a vehicle is provided on a vehicle test device, such as a chassis dynamometer, and a vehicle test is carried out, the vehicle is restrained on the vehicle test device by connecting cord-like members which restrain the vehicle to right and left front side end portions and rear side end portions of the vehicle (see a patent document 1).

PRIOR ART DOCUMENT

Patent Document

Patent Document 1: Japanese Patent Application Publication S62-209334

SUMMARY OF THE INVENTION

In a vehicle restraining type by cord-like members, during reproducing the behavior of vehicle movement, such as chip-in shock, a mechanical resonance characteristic by the rigidity of a vehicle restraining device and a vehicle becomes close to a vibration characteristic of the vehicle movement, and consequently, it becomes difficult to reproduce vehicle behavioral frequencies that are close to those of on a road.

In consideration of such a situation, an object of the present invention is to reproduce vehicle behavioral frequencies during a vehicle test that are close to those on a road.

In an aspect of the present invention, a vehicle restraining device which restrains a vehicle provided on a vehicle test device includes: a first attachment member attached to a corresponding one of right and left front end portions and right and left rear end portions of the vehicle; a support post unit installed vertically at a position close to the corresponding one of the right and left front end portions and the right and left rear end portions of the vehicle; a second attachment member attached to the support post unit; and a buffer unit which is provided between the first attachment member and the second attachment member and which is filled with air and can be compressed freely.

In an aspect of the second attachment member, the second attachment member is provided with an attachment main body portion connected to the support post unit and to the buffer unit, and the attachment main body portion includes an air supply portion configured to supply the air to the buffer unit.

In an aspect of the support post unit, the support post unit is disposed to be adjustable in any of a vehicle width direction, a vehicle longitudinal direction and a vehicle height direction of the vehicle.

In an aspect of the vehicle restraining device, a restraining force measuring instrument configured to measure a restraining force of the vehicle is provided between the support post unit and the second attachment member.

In an aspect of the vehicle restraining device, the vehicle restraining device further includes an air pressure control device configured to control a pressure of the air supplied to the buffer unit.

In an aspect of the air pressure control device, the air pressure control device compares a behavioral resonance point of the vehicle restraining device which is detected at a time of a test of the vehicle by the vehicle test device with a behavioral resonance point of the vehicle on a road which is measured in advance, and controls the air pressure such that these two behavioral resonance points do not interfere with each other.

In an aspect of the vehicle restraining device, the vehicle restraining device further includes a vibration damping device configured to damp vibration of the buffer unit which occurs at the time of the test of the vehicle is disposed between the first attachment member and the second attachment member to be parallel to the buffer unit.

According to the above invention, the resonance frequency of the vehicle restraining device is avoided from interfering with the behavioral frequency of the chip-in shock, and consequently, vehicle behavioral frequencies during a vehicle test that are close to those on a road can be reproduced.

MODE FOR IMPLEMENTING THE INVENTION

In the following, embodiments of the present invention will be explained with reference to the drawings.

First Embodiment

Figure 1:
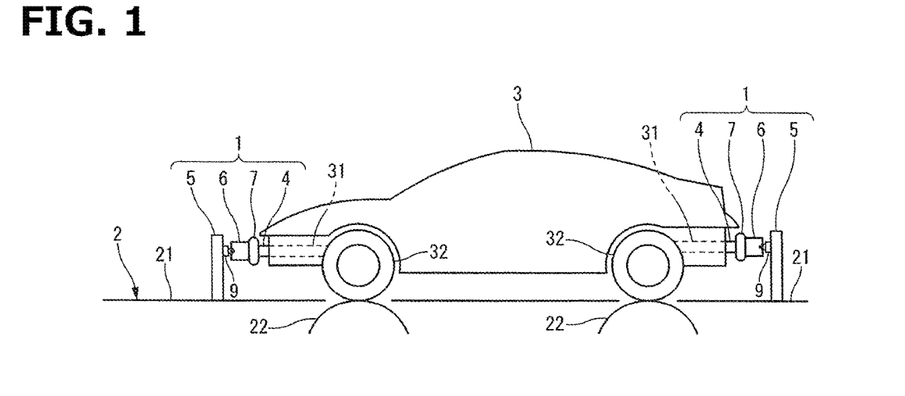
FIG. 1 is a side schematic diagram of a vehicle test device equipped with a vehicle restraining device that is one embodiment of the present invention.
Figure 2:
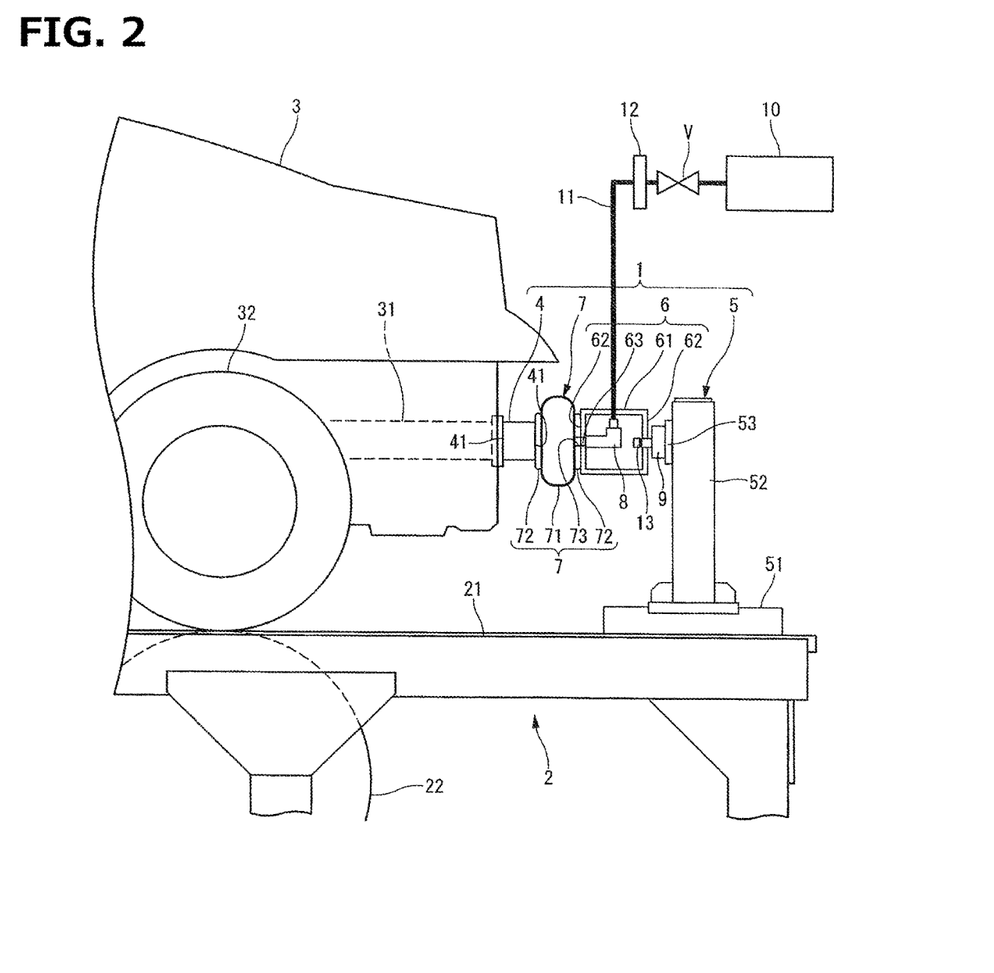
FIG. 2 is a side schematic diagram of the vehicle restraining device in the above embodiment which shows the inside of a second attachment member.

Vehicle restraining devices 1 shown in FIG. 1 and FIG. 2 are vehicle restraining devices which restrain a vehicle 3 as a test vehicle which is provided on a roller type chassis dynamometer (vehicle test device) 2 that is an aspect of the vehicle test device.

As shown in FIG. 1, the vehicle restraining devices 1 are each provided with a first attachment member 4, a support post unit 5, a second attachment member 6 and a buffer unit 7. The first attachment members 4 are each attached to right and left front end portions and right and left rear end portions of the vehicle 3 which is mounted on a test stand 21 of the chassis dynamometer 2. Each of the support post units 5 is installed vertically in the vicinities of the right and left front end portions and rear end portions of the vehicle 3. The second attachment members 6 are attached to the respective support post units 5. Each of the buffer units 7 is provided between a corresponding one of the first attachment members 4 and a corresponding one of the second attachment members 6. Further, the buffer units 7 are filled with air and can be compressed freely.

As shown in FIG. 2, each of the first attachment members 4 is made of a steel material and formed in a square cylindrical shape. First side surface portions 41 of the first attachment members 4 are fixed to respective one ends of side members 31 on right and left front sides and on right and left rear sides of the vehicle 3 by fasteners formed of bolts and nuts. On the other hand, second side surface portions 41 formed on the opposite side to the first side surface portions 41 are fixed to the respective first end sides of the buffer units 7 by the fasteners.

The second attachment members 6 are provided with respective attachment main body portions 61 including air supply portions 8 configured to supply air to the buffer units 7. The attachment main body portions 61 accommodating the respective air supply portions 8 are each made of a steel material and formed in a square cylindrical shape. First side surface portions 62 of the attachment main body portions 61 are attached to respective attachment surface portions 72 of the buffer units 7. On the other hand, second side surface portions 62 of the attachment main body portions 61, which are positioned on the opposite side to the first side surface portions 62, are connected to the respective support post units 5 via restraining force measuring instruments 9 which will be mentioned below. In addition, the first side surface portions 62 of the attachment main body portions 61 are formed with respective connection holes 63. The air supply portions 8 are connected to the respective connection holes 63, and the connection holes 63 communicate communication holes 73 of the attachment surface portions 72 of the buffer units 7 with the air supply portions 8.

Each of the buffer units 7 is provided with an air filling portion 71 filled with air which is made of an elastic member which can be compressed freely and which has a tire shape, and with a pair of disk-like attachment surface portions 72 attached to both of the surfaces of the air filling portion 71. First attachment surface portions 72 of the buffer units 7 are connected to the respective second side surface portions 41 of the first attachment members 4 by the above-mentioned fasteners. Second attachment surface portions 72 of the buffer units 7 are connected to the respective attachment main body portions 61 of the second attachment members 6 by the above-mentioned fasteners. The middle parts of the second attachment surface portions 72 are formed with the respective communication holes 73. The air supply portions 8 are connected to the respective communication holes 73, and the communication holes 73 communicate the air filling portions 71 with the air supply portions 8.

The air supply portions 8 are connected with respective air supply pipes 11 which introduce the air supplied from compressors (air supply devices) 10. The air supply pipes 11 are provided with respective pressure regulating valves 12 which regulate the air pressure of the butter units 7 to a predetermined range, and with respective valves V which perform the supply and the stop of the air.

Each of the support post units 5 can be adjusted in any of the vehicle width direction, the vehicle longitudinal direction and the vehicle height direction of the vehicle 3 or in all of them. That is, each of the support post units 5 is provided with a pedestal portion 51 which is disposed on the test stand 21 so as to be adjustable in the vehicle longitudinal direction, and with a support post main body portion 52 which is disposed on the pedestal portion 51 so as to be adjustable in the vehicle height direction. The length of each of the support post main body portions 52 can be adjusted in the vehicle height direction.

Each of the restraining force measuring instruments 9 which measures the restraining force of the vehicle 3 is provided between a corresponding one of the support post units 5 and a corresponding one of the second attachment members 6. The restraining force measuring instruments 9 are attached to the respective side surface portions of the support post main body portions 52 in the support post units 5, side surface portions which face the second attachment members 6, via third attachment members 53. The second attachment members 6 are connected to the respective restraining force measuring instruments 9 by corresponding ones of connectors 13 formed of bolts and nuts.

An usage example of the vehicle restraining devices 1 of the present embodiment will be explained with reference to FIG. 1 and FIG. 2.

First, the vehicle 3 in which the right and left front end portions and the right and left rear end portions of side members 31 are exposed is mounted on the test stand 21 in a state in which wheels 32 of the vehicle 3 are set on respective rollers 22. Next, the first side surface portions 41 of the first attachment members 4 are fixed to the front end portions and the rear end portions of the side members 31 of the vehicle 3 by the fasteners. Next, the second side surface portions 41 of the first attachment members 4 are fixed with the respective second attachment surface portions 72 of the buffer units 7 by the fasteners. On the other hand, the second attachment surface portions 72 of the buffer units 7 are fixed with the respective first side surface portions 62 of the second attachment members 6 by the fasteners. Next, the second side surface portions 62 of the second attachment members 6 are connected to the respective restraining force measuring instruments 9 by the connectors 13, restraining force measuring instruments 9 which are attached to the respective support post units 5 disposed on the test stand 21. Next, when the air supply portions 8 are accommodated in the respective attachment main body portions 61 of the second attachment members 6 and connected to the respective connection holes 63 of the side surface portions 62, each of the supply portions 8 becomes in a state of communicating with a corresponding one of the air filling portions 71 of the buffer units 7 via a corresponding one of the connection holes 63 and a corresponding one of the communication holes 73. These air supply portions 8 are connected with the respective air supply pipes 11 which are equipped with the respective pressure regulating valves 12 and valves V and which are connected to the respective compressors 10. Accordingly, the vehicle 3 is restrained by the vehicle restraining devices 1 in the chassis dynamometer 2.

During the test of the vehicle 3, air is supplied from the compressors 10 to the buffer units 7 of the vehicle restraining devices 1, and the air pressure in each of the buffer units 7 is adjusted to a predetermined pressure range by the pressure regulating valves 12 in advance. After that, the rollers 22 of the chassis dynamometer 2 rotate, and each test of the vehicle 3 is performed.

In the vehicle restraining devices 1 of the present embodiment, since the air pressure in each of the buffer units 7 is maintained in a predetermined range and the air filling portions 71 can be compressed freely, the rigidity between the vehicle 3 and each of the support post units 5 can be set lower than rigidity in a conventional vehicle restraining device.

Therefore, when the behavior of the vehicle that is assumed to travel on a road is reproduced, the mechanical resonance characteristic by the rigidity of the vehicle restraining devices 1 and the rigidity of the vehicle 3 is deviated from the vibration characteristic of the vehicle 3. Consequently, vehicle behavior that is close to that on a road can be reproduced, such as the vehicle behavior at the time of start, vehicle forward and backward movement, acceleration, deceleration or a change in speed and the vehicle behavior at the time of a jerk phenomenon or a judder phenomenon.

For example, it is possible to avoid interference with the frequency of the vehicle behavior, such as chip-in shock, and vehicle behavioral frequencies that are close to those on a road can be reproduced. More specifically, it is possible to eliminate deterioration in accuracy of the reproducibility of the vehicle behavior due to that the resonance characteristic by the rigidity in a conventional vehicle restraining device is close to behavior frequency characteristics, such as chip-in shock.

Figure 3:
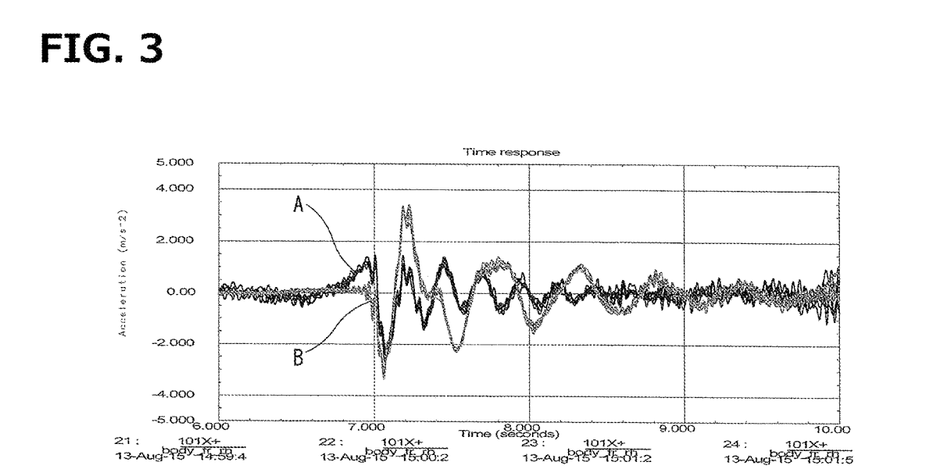
FIG. 3 is a characteristic diagram showing waveforms of longitudinal acceleration at the time of chip-in shock of a test vehicle set to the vehicle test device of the above embodiment.

FIG. 3 shows waveforms of longitudinal acceleration at the time of the chip-in shock of the vehicle 3 restrained by the vehicle restraining devices 1 of the chassis dynamometer 2. The longitudinal acceleration waveform of the vehicle 3 on a road is shown by "A", and the longitudinal acceleration waveform of the vehicle 3 restrained by the vehicle restraining devices 1 is shown by "B".

Figure 4:
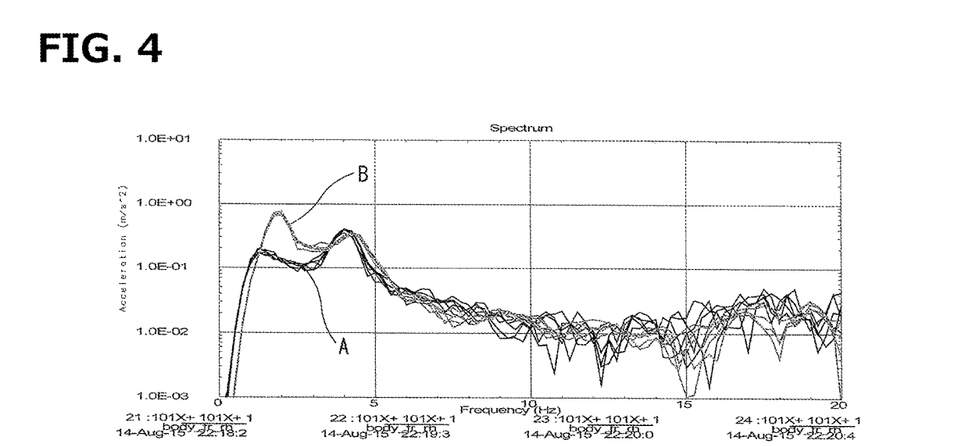
FIG. 4 is a characteristic diagram showing the relation between the longitudinal acceleration and a frequency of the chip-in shock.

FIG. 4 shows the relation between the longitudinal acceleration and the frequency of the chip-in shock. The behavioral frequency waveform of the vehicle 3 on a road is shown by "A", and the behavioral frequency waveform of the vehicle 3 restrained by the vehicle restraining devices 1 is shown by "B"

According to the characteristic diagrams of FIG. 3 and FIG. 4, the resonance frequency of the vehicle restraining devices 1 is close to an on-road waveform which is deviated from the behavioral waveform of the chip-in shock of the vehicle 3, and it can be confirmed that by the vehicle restraining devices 1, the reproducibility of the vehicle behavior on a road is enhanced, as compared with conventional vehicle restraining devices.

Figure 5:
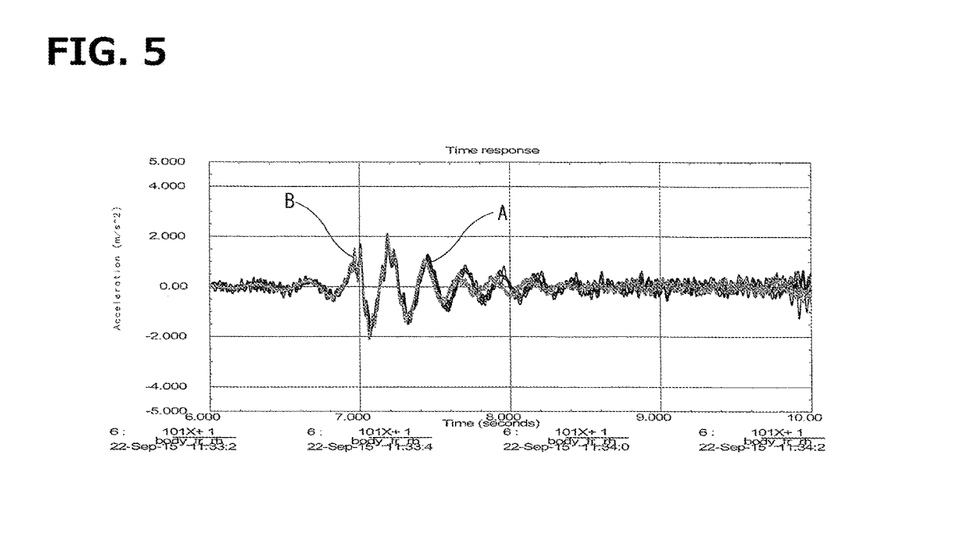
FIG. 5 is a characteristic diagram showing a waveform of the longitudinal acceleration after removing a resonance frequency of the vehicle restraining device by a bandpass filter.

FIG. 5 shows waveforms of the longitudinal acceleration after removing the resonance frequency of the vehicle restraining devices 1 by a bandpass filter (3-30 Hz). The longitudinal acceleration waveform of the vehicle 3 on a road is shown by "A", and the longitudinal acceleration waveform of the vehicle 3 restrained by the vehicle restraining devices 1 is shown by "B".

Figure 6:
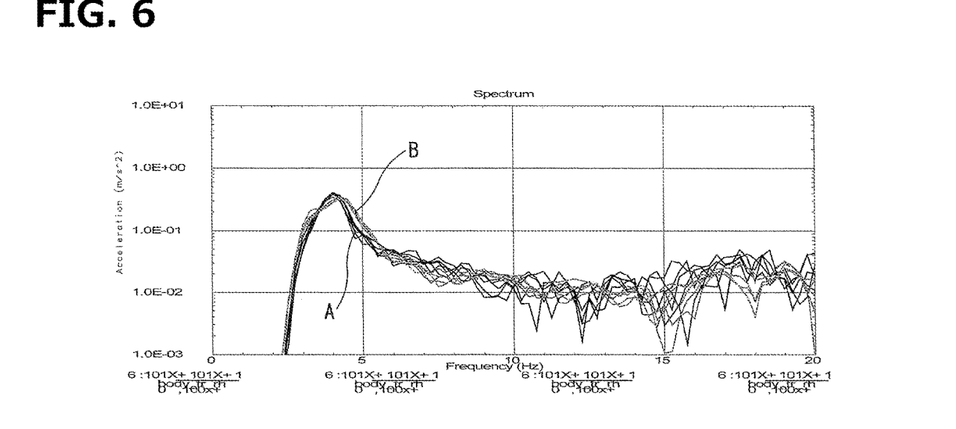
FIG. 6 is a characteristic diagram showing the relation between the longitudinal acceleration after removing the resonance frequency of the vehicle restraining device by the bandpass filter and a frequency of the chip-in shock.

FIG. 6 shows the relation between the longitudinal acceleration after removing the resonance frequency of the vehicle restraining devices 1 by the bandpass filter and the frequency of the chip-in shock. The behavioral frequency waveform of the vehicle 3 on a road is shown by "A", and the behavioral frequency waveform of the vehicle 3 restrained by the vehicle restraining devices 1 is shown by "B".

According to the characteristic diagrams of FIG. 5 and FIG. 6 each showing the waveform in which the resonance frequency (in this case, 2 Hz) of the vehicle restraining devices 1 is removed by the bandpass filter, it is clearly shown that accuracy in the reproducibility of the behavior of the vehicle 3 on a road is high.

In addition, since the support post units 5 of the respective vehicle restraining devices 1 are disposed to be adjustable in any of the vehicle width direction, the vehicle longitudinal direction and the vehicle height direction of the vehicle 3 or in all of them, it becomes possible to connect the buffer units 7 to various types of vehicles, and thereby tests according to a type of a vehicle can be performed.

Moreover, since each of the restraining force measuring instruments 9 is provided between a corresponding one of the support post units 5 and a corresponding one of the second attachment members 6, the restraining force of the vehicle 3 can be detected, and consequently, in addition to the above effects, the force measuring in the longitudinal direction of the vehicle 3 and its analysis and evaluation can be possible.

Furthermore, since the first attachment members 4 and the second attachment members 6 are each formed in a square cylindrical shape, in addition to the weight reduction of the vehicle restraining devices 1, each of the buffer units 7 can be stably provided between the vehicle 3 and a corresponding one of the support post units 5, and consequently, the effect of the reproducibility of the behavior of the vehicle 3 can be stably maintained.

Second Embodiment

In addition, in the vehicle restraining devices 1, air pressure control devices 14 are equipped, instead of the pressure regulating valves 12. Each of the air pressure control devices 14 compares the behavioral resonance point of each of the vehicle restraining devices 1 which is detected at the time of the test of the vehicle 3 by the chassis dynamometer 2 with the behavioral resonance point of the vehicle 3 on a road which is measured in advance, and controls the air pressure in each of the buffer units 7 such that these two behavior resonance points do not interfere with each other.

Figure 7:
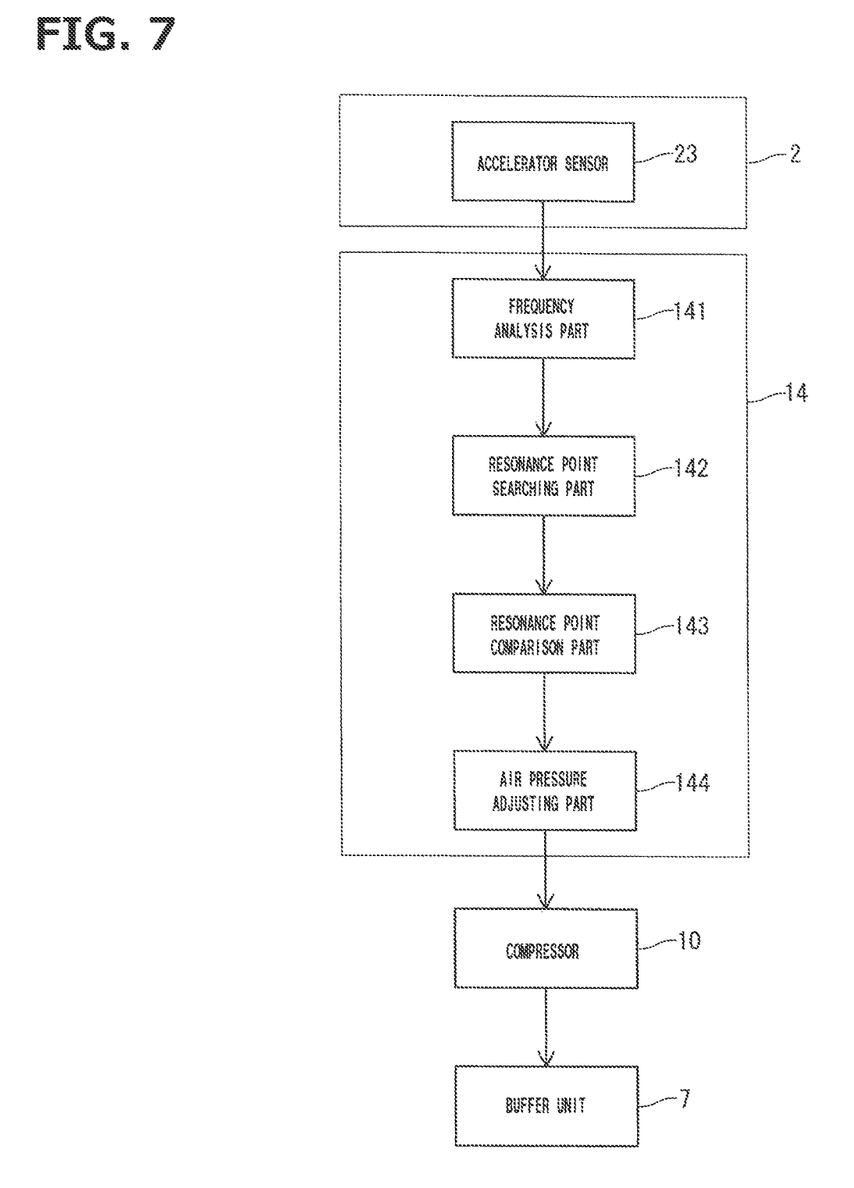
FIG. 7 is a block diagram showing, as an example, an air compression device equipped to the vehicle restraining device.

As shown in FIG. 7, each of the air pressure control devices 14 is provided with a frequency analysis part 141, a resonance point searching part 142, a resonance point comparison part 143 and an air pressure adjusting part 144.

Each of the frequency analysis parts 141 calculates the behavior frequency of each of the vehicle restraining devices 1 at the time of the chip-in shock of the vehicle 3 based on a change in the longitudinal direction acceleration of the vehicle 3 with time which is detected by a corresponding one of accelerator sensors 23 of the chassis dynamometer 2 at the time of the driving of the vehicle 3.

Each of the resonance point searching parts 142 calculates the behavioral resonance point of each of the vehicle restraining devices 1 based on the calculated behavioral frequency of each of the vehicle restraining devices 1.

Each of the resonance point comparison parts 143 compares the calculated behavioral resonance point of each of the vehicle restraining devices 1 with the behavioral resonance point of the vehicle 3 on a road.

Each of the air pressure adjusting parts 144 calculates the pressure value of a corresponding one of the buffer units 7 based on the above comparison, pressure value at which the behavioral resonance frequency of each of the vehicle restraining devices 1 and the behavioral resonance frequency of the vehicle 3 on a road are deviated from each other.

Each of the compressors 10 supplies an air with the calculated pressure value to a corresponding one of the buffer units 7.

As the above, according to the vehicle restraining devices 1 including the respective air pressure control devices 14, the air pressure of each of the buffer units 7 is controlled such that the behavioral resonance frequency of each of the vehicle restraining devices 1 does not interfere with the behavioral resonance frequency of the vehicle 3. By this control of the air pressure of each of the buffer units 7, the rigidity of each of the vehicle restraining devices 1 is adjusted, and consequently, the reproducibility of the behavioral frequency of the vehicle 3 that is assumed to travel on a road is further improved.

Third Embodiment

Figure 8:
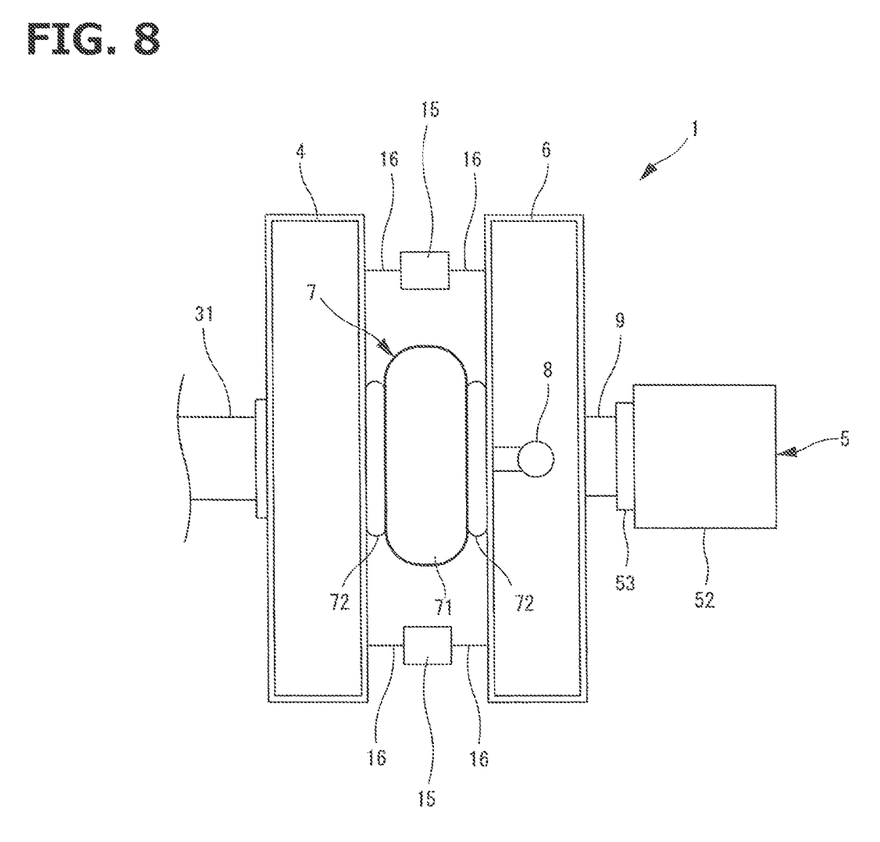
FIG. 8 is a schematic plan view showing, as an example, a vehicle restraining device that is another aspect of the present invention.

Further, in the vehicle restraining devices 1, as shown in FIG. 8, dampers (vibration damping devices) 15 are disposed between the first attachment members 4 and the second attachment members 6 so as to be parallel to the buffer units 7. For example, well-known dampers which reduce mechanical vibration can be applied as the dampers 15. The dampers 15 are connected to the first attachment members 4 and the second attachment members 6 via connection members 16.

Figure 9:
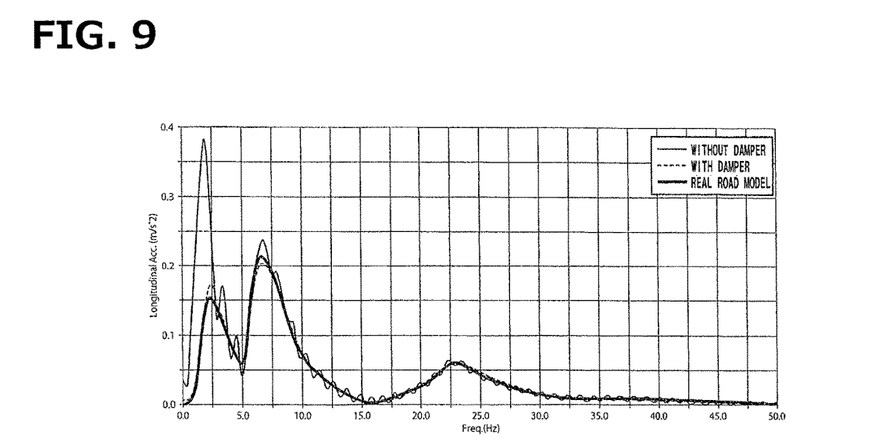
FIG. 9 is a characteristic diagram showing the relation between the longitudinal acceleration in the case that the vehicle restraining device that is the above aspect is applied and a frequency of the chip-in shock.

According to the vehicle restraining devices 1 equipped with the dampers 15, the resonance gain of the vehicle restraining devices 1 is reduced by the dampers 15 at the time of the test of the vehicle 3, and as shown in FIG. 9, the reproducibility of the frequency waveform of the vehicle 3, in particular, the reproducibility of the frequency waveform of the vehicle 3 at the time of the chip-in shock becomes high.

FIG. 9 shows the relations between the longitudinal acceleration of the vehicle 3 in the case that the vehicle restraining devices 1 are provided with dampers 15 and the frequency of the chip-in shock of the vehicle 3 and between the longitudinal acceleration of the vehicle 3 in the case that the vehicle restraining devices 1 are not provided with dampers 16 and the frequency of the chip-in shock of the vehicle 3. According to the present characteristic diagram, by the vehicle restraining devices 1 including dampers 15, the vibration waveform of the behavior of the vehicle 3 that is close to that of the behavior of the vehicle 3 on a road can be grasped, as compared with the case that the vehicle restraining devices 1 do not include dampers 15.

As the above, by providing the dampers 15 to the vehicle restraining devices 1, it becomes unnecessary to carry out bandpass filter processing to confirm the behavioral waveform of the vehicle 3 that is assumed to travel on a road.

As the above, although the embodiments of the present invention have been specifically explained, it is obvious for a person skilled in the art that a variety of modification can be possible within a range of technical ideas of the present invention, and it is obvious that the modification belongs to a range of the scope of claims.

For example, even if the vehicle restraining devices 1 of the present invention are applied to a flat-belt-type chassis dynamometer, the same effects as those of the above embodiments can be obtained, and the longitudinal acceleration of the vehicle 3 that is assumed to travel on a road can be reproduced by the chassis dynamometer. Therefore, the reproducibility of the longitudinal vibration phenomenon of the vehicle on a road and the reproducibility of vehicle behavior, such as vehicle behavior at the time of start, vehicle forward and backward movement, acceleration, deceleration or a change in speed, and vehicle behavior at the time of a jerk phenomenon or a judder phenomenon, are improved, and the evaluation test of driveability can be carried out. This application example also belongs to the range of the technical ideas of the present invention.

The invention claimed is:

1. A vehicle restraining device which restrains a vehicle provided on a vehicle test device, comprising:
    a first attachment member attached to a corresponding one of right and left front end portions and right and left rear end portions of the vehicle;
    a support post unit installed vertically at a position close to the corresponding one of the right and left front end portions and the right and left rear end portions of the vehicle;
    a second attachment member attached to the support post unit;
    a buffer unit which is provided between the first attachment member and the second attachment member and which is filled with air and can be compressed freely; and
    a restraining force measuring instrument which is provided between the support post unit and the second attachment member and which is configured to measure a restraining force of the vehicle.

2. The vehicle restraining device according to claim 1, further comprising an air pressure control device configured to control a pressure of the air supplied to the buffer unit.

3. The vehicle restraining device according to claim 1, wherein the second attachment member is provided with an attachment main body portion connected to the support post unit and to the buffer unit, and
    wherein the attachment main body portion includes an air supply portion configured to supply the air to the buffer unit.

4. The vehicle restraining device according to claim 1, wherein the support post unit is disposed to be adjustable in any of a vehicle width direction, a vehicle longitudinal direction and a vehicle height direction of the vehicle.

5. A vehicle restraining device which restrains a vehicle provided on a vehicle test device, comprising:
    a first attachment member attached to a corresponding one of right and left front end portions and right and left rear end portions of the vehicle;
    a support post unit installed vertically at a position close to the corresponding one of the right and left front end portions and the right and left rear end portions of the vehicle;
    a second attachment member attached to the support post unit;
    a buffer unit which is provided between the first attachment member and the second attachment member and which is filled with air and can be compressed freely; and
    a vibration damping device which is disposed between the first attachment member and the second attachment member to be parallel to the buffer unit and which is configured to damp vibration of the buffer unit which occurs at a time of a test of the vehicle.

6. The vehicle restraining device according to claim 5, further comprising an air pressure control device configured to control a pressure of the air supplied to the buffer unit.

7. The vehicle restraining device according to claim 5, wherein the second attachment member is provided with an attachment main body portion connected to the support post unit and to the buffer unit, and wherein the attachment main body portion includes an air supply portion configured to supply the air to the buffer unit.

8. The vehicle restraining device according to claim 5, wherein the support post unit is disposed to be adjustable in any of a vehicle width direction, a vehicle longitudinal direction and a vehicle height direction of the vehicle.

9. A vehicle restraining device which restrains a vehicle provided on a vehicle test device, comprising:

a first attachment member attached to a corresponding one of right and left front end portions and right and left rear end portions of the vehicle;

a support post unit installed vertically at a position close to the corresponding one of the right and left front end portions and the right and left rear end portions of the vehicle;

a second attachment member attached to the support post unit;

a buffer unit which is provided between the first attachment member and the second attachment member and which is filled with air and can be compressed freely; and an air pressure control device which compares a behavioral resonance point of the vehicle restraining device which is detected at a time of a test of the vehicle by the vehicle test device with a behavioral resonance point of the vehicle on a road which is measured in advance, and which controls a pressure of air which is supplied to the buffer unit such that these two behavioral resonance points do not interfere with each other.

10. The vehicle restraining device according to claim 9, wherein the second attachment member is provided with an attachment main body portion connected to the support post unit and to the buffer unit, and wherein the attachment main body portion includes an air supply portion configured to supply the air to the buffer unit.

11. The vehicle restraining device according to claim 9, wherein the support post unit is disposed to be adjustable in any of a vehicle width direction, a vehicle longitudinal direction and a vehicle height direction of the vehicle.

* * * * *